United States Patent
Neumann et al.

(10) Patent No.: US 6,741,393 B1
(45) Date of Patent: May 25, 2004

(54) OPTICAL SYSTEM WITH OPTICAL FREQUENCY DISCRIMINATOR

(75) Inventors: Margarete Neumann, Penetanguishine (CA); Rekha Doshi, Victoria Harbour (CA); Robert Pursel, Victoria Harbour (CA); Brien Ross, Wyevale (CA)

(73) Assignee: Raytheon Company, Waltham, MA (US)

( * ) Notice: Subject to any disclaimer, the term of this patent is extended or adjusted under 35 U.S.C. 154(b) by 142 days.

(21) Appl. No.: 10/053,273

(22) Filed: Jan. 17, 2002

(51) Int. Cl.7 .............................................. G02B 27/00
(52) U.S. Cl. ........................ 359/578; 385/24; 398/82; 398/85
(58) Field of Search ...................... 385/24, 47; 398/82, 398/85; 359/578

(56) References Cited

U.S. PATENT DOCUMENTS

| | | |
|---|---|---|
| 4,244,045 A | 1/1981 | Nosu et al. |
| 4,904,043 A | 2/1990 | Schweizer |
| 5,583,683 A | 12/1996 | Scobey |
| 5,889,904 A | 3/1999 | Pan et al. |
| 5,917,626 A * | 6/1999 | Lee ............................... 398/88 |
| 5,943,149 A * | 8/1999 | Cearns ........................ 398/79 |
| 5,946,435 A | 8/1999 | Zheng et al. |
| 6,067,178 A * | 5/2000 | Zheng ............................ 398/1 |
| 6,215,592 B1 | 4/2001 | Pelekhaty |

* cited by examiner

*Primary Examiner*—Drew Dunn
*Assistant Examiner*—Leo Boutsikaris
(74) *Attorney, Agent, or Firm*—William C. Schubert; Glenn H. Lenzen, Jr.

(57) ABSTRACT

An optical system includes an optical frequency discriminator having a light source of an optical input beam, and an optical bandpass filter having a bandpass filter range and the optical input beam incident thereon at a bandpass-filter angle of incidence and may be desirably be adjusted. The optical bandpass filter transmits a first transmitted beam of a bandpass-filter frequency band and reflects a first reflected beam. An optical second filter has an optical edge in the bandpass range of the bandpass filter and the first reflected beam incident thereon at a second-filter angle of incidence. The optical second filter transmits a second transmitted beam band and reflects a second reflected beam.

23 Claims, 3 Drawing Sheets

OPTICAL SYSTEM WITH OPTICAL FREQUENCY DISCRIMINATOR

This invention relates to optical communications devices and, more particularly, to an optical device that splits an optical beam into three separate frequency bands.

BACKGROUND OF THE INVENTION

In an optical communications system, information is encoded onto a light signal. The light signal is transmitted from one point to another, as for example by free-space light beams or optical fibers. At the receiving end, the information is read from the light signal.

An important advantage of optical communications is that a number of different light signals of different frequencies may be mixed together (multiplexed) onto a single light beam in a technique known as wavelength division multiplexing (WDM). Each light signal of a different frequency (and thence wavelength), or channel, has information encoded onto it prior to the mixing of the channels. At the receiving end, the channels are separated, or demultiplexed, according to their frequencies. In one approach, a series of light bandpass filters are used to sequentially extract the channels, one at a time, from the light beam. The information on each channel is read from the demultiplexed light of that frequency. A single multiplexed light beam may therefore carry many times the information that may be transmitted by a non-multiplexed light beam.

As the number of channels in the multiplexed beam increases, the power carried by the beam increases. At the receiving end, each of the optical devices used to extract the channels must function at the power level carried by the optical beam at that point. The light bandpass filters may be made with the capability of functioning under high power levels, but providing this capability adds to their cost.

There is a need for an approach that allows the power levels on the individual channel separators to be reduced, while at the same time not degrading the quality of the optical beam or interfering with the demultiplexing function. The present invention fulfills this need, and further provides related advantages.

SUMMARY OF THE INVENTION

The present invention provides an optical frequency discriminator that divides an optical input beam into exactly three separate frequency bands. These frequency bands may each contain a number of channels of information mixed into the light of the frequency bands. The channels are thereafter demultiplexed using conventional techniques. The present approach reduces the power loading on the demultiplexing optical devices, so that they may be constructed less expensively than would otherwise be the case. The present apparatus is compact and relatively simple and inexpensive to build. It is tunable to optimize its performance. The present discussion is in terms of frequency of the light, but it is equally applicable to a discussion of wavelength.

In accordance with the invention, an optical system includes an optical frequency discriminator comprising a light source of an optical input beam, and an optical bandpass filter having a bandpass filter range and the optical input beam incident thereon at a bandpass-filter angle of incidence. The optical bandpass filter transmits a first transmitted beam of a bandpass-filter frequency band and reflects a first reflected beam. An optical second filter has an optical edge in the bandpass range of the bandpass filter and the first reflected beam incident thereon at a second-filter angle of incidence. The optical second filter transmits a second transmitted beam and reflects a second reflected beam. Desirably, the optical frequency discriminator further includes an optical bandpass filter angular adjustment that alters the bandpass-filter angle of incidence of the optical bandpass filter relative to the optical input beam, and/or an optical second filter angular adjustment that alters the second-filter angle of incidence of the second filter relative to the first reflected beam. The optical second filter may be a low-pass filter that transmits light having a frequency less than the optical edge and reflects light having a frequency greater than the optical edge, or a high-pass filter that transmits light having a frequency greater than the optical edge and reflects light having a frequency less than the optical edge. The optical system typically includes a first optical device that receives the first transmitted beam, a second optical device that receives the second transmitted beam, and a third optical device that receives the second reflected beam. The first optical device, the second optical device, and the third optical device preferably each comprises an optical demultiplexer.

Stated alternatively, an optical frequency discriminator comprises a light source of an optical input beam, and an optical bandpass filter having a bandpass filter range and the optical input beam incident thereon at a bandpass-filter angle of incidence. The optical bandpass filter transmits a first transmitted beam of a bandpass filter angle and reflects a first reflected beam including a first reflected frequency range less than the bandpass-filter range and a second reflected frequency range greater than the bandpass-filter range. An optical second filter has the first reflected beam incident thereon at an optical-second-filter angle of incidence. The optical second filter transmits one of the first reflected frequency range and the second reflected frequency range and reflects the other of the first reflected frequency range and the second reflected frequency range. The optical second filter is preferably but not necessarily an edge filter. Most preferably, the optical frequency discriminator has exactly these two optical filters—the optical bandpass filter and the optical second filter—and no other optical filters.

The optical frequency discriminator preferably splits the optical input beam into exactly three component bands, which may then be passed to the demultiplexer devices. Because the optical input beam is split into components, the demultiplexer devices need only be operational with beams of lower power than would be the case if the full-power optical input beam were incident upon the demultiplexer devices. Thus, while the optical bandpass filter must be suitable for operation at the full beam power, it is the only filter with that requirement. The other filters may be sized and constructed for lower-power operation.

The optical frequency discriminator is tunable to optimize its performance for the specific frequencies of the optical input beam. The tuning is accomplished readily and mechanically, by changing the angle of incidence of the beams on the filters.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
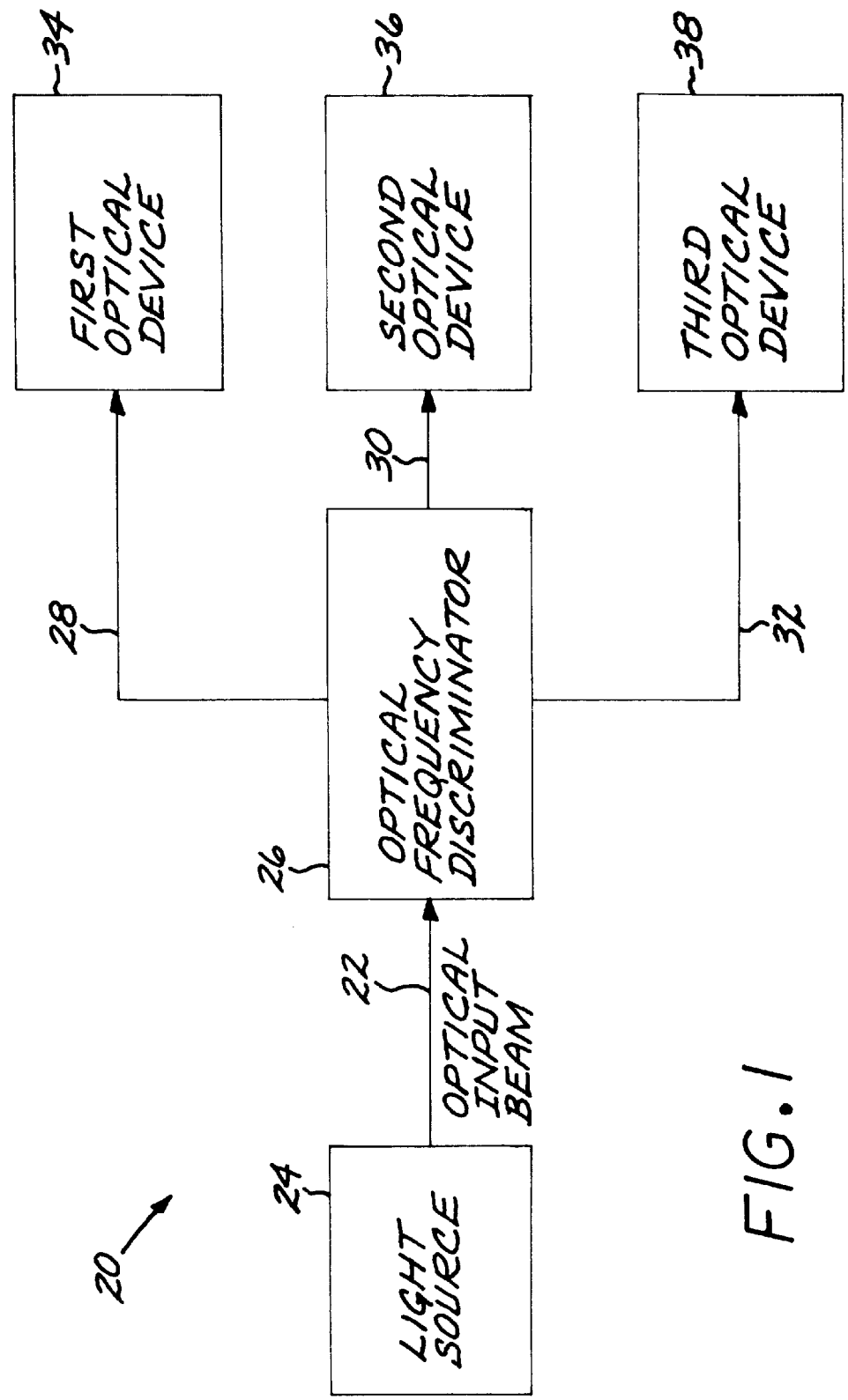
FIG. 1 is a block diagram of an optical system.

FIG. 1 depicts an optical system 20 in which an optical input beam 22 from a light source 24 is input to an optical frequency discriminator 26. The optical input beam is a broadband optical signal having individual optical channels of a number of different frequencies. The optical frequency discriminator 26 produces three outputs 28, 30, and 32, each of which is a narrowband optical signal having individual optical channels of a number of different frequencies. Each of the narrowband optical signals of the three outputs 28, 30, and 32 includes that portion of the totality of the individual optical channels within the frequency range of that output. The outputs 28, 30, and 32 are provided to respective optical devices 34, 36, and 38 for further processing. The power in each of the three outputs 28, 30, and 32 is less than that of the optical input beam 22, so that the requirement of power-handling capability of the respective optical devices 34, 36 and 38 is less than would be required in the absence of the optical frequency discriminator 26. The optical devices 34, 36, and 38 may be of any operable type, such as a demultiplexer that extracts the individual optical channels, a spectrometer, an interferometer, an energy dispersive monochromator, or a power detector. The three optical devices 34, 36, and 38 may be of the same type or of different types.

Figure 2:
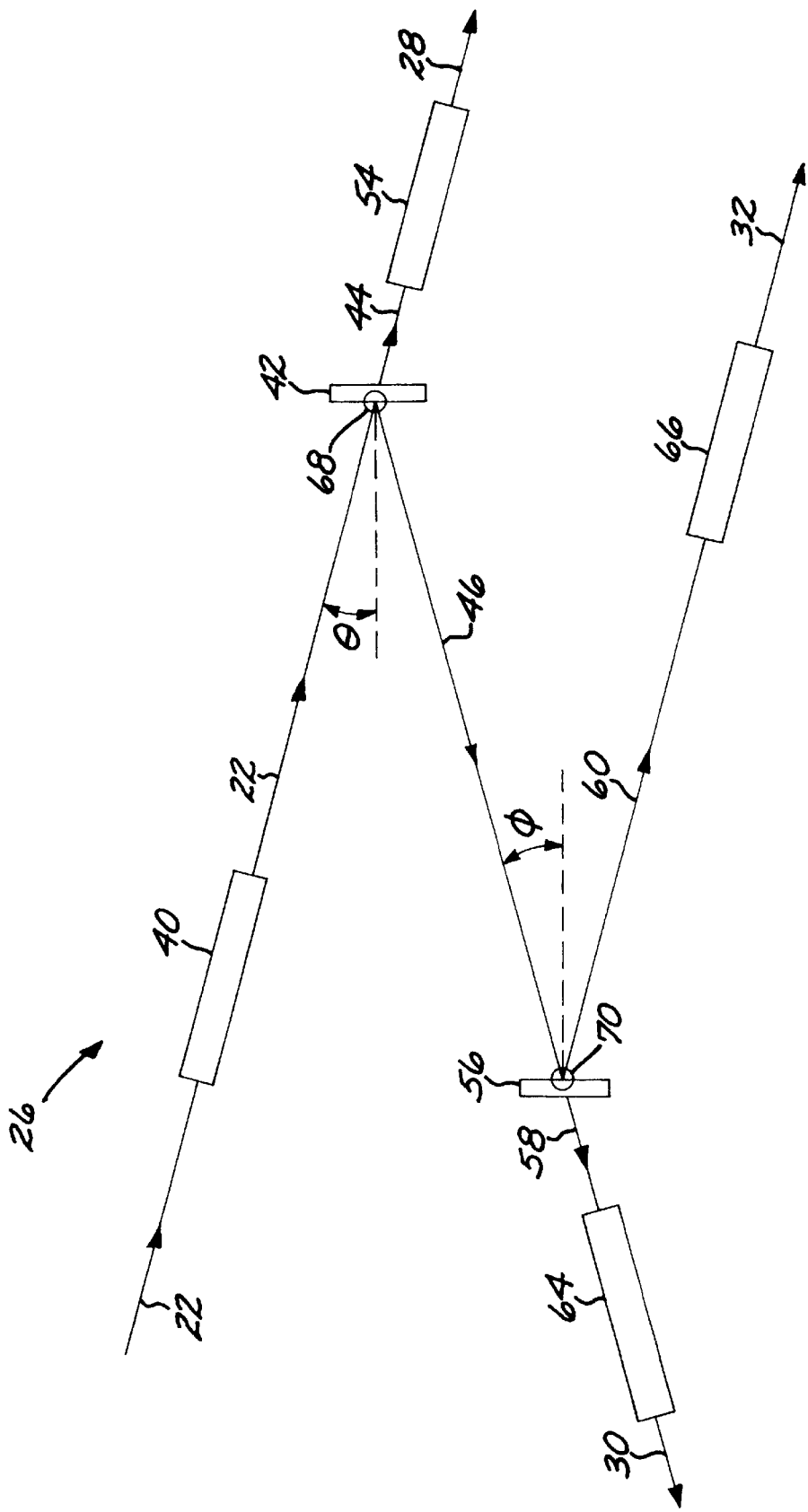
FIG. 2 is a schematic plan view of an optical frequency discriminator.

The optical frequency discriminator 26, a preferred embodiment of which is illustrated in greater detail in FIG. 2, includes a local light source 40 of the optical input beam 22. The local light source 40 may be the light source 24, or more typically is a structure within the optical frequency discriminator 26 such as a collimator that collimates the optical input beam 22.

Figure 3:
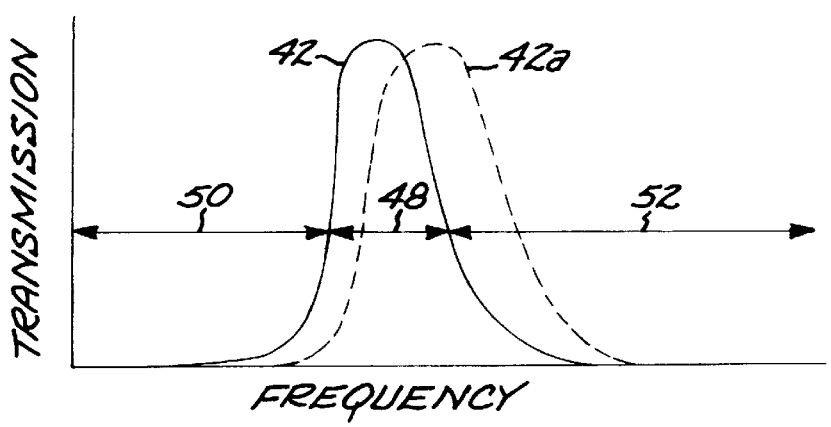
FIG. 3 is an idealized graph of light transmission of the optical bandpass filter as a function of frequency, illustrating its response to changes in the angle of incidence.

An optical bandpass filter 42, whose optical properties are illustrated in FIG. 3, has a bandpass filter range when the optical input beam 22 is incident thereon at a first bandpass-filter angle of incidence $\theta$. Such optical filters 42 are known in the art for other purposes, see for example U.S. Pat. Nos. 4,244,045, 5,583,683, and 6,215,592, whose disclosures are incorporated by reference, and are typically multilayer structures. The optical bandpass filter 42 transmits a first transmitted beam 44 and reflects a first reflected beam 46. The first transmitted beam 44 includes light in the bandpass-filter frequency band 48 defined by the transmission properties of the optical bandpass filter 42 as illustrated in FIG. 3. The first reflected beam 46 includes all of the light frequencies of the optical input beam 22 that are not within the bandpass-filter frequency band 48, and specifically a first reflected frequency range 50 less than the bandpass-filter range 48 and a second reflected frequency range 52 greater than the bandpass-filter range 48.

The first transmitted beam 44 is received by a receiving device. The receiving device may be the first optical device 34, but more typically is a collimator 54 whose output is the first output 28 that is then provided to the first optical device 34.

An optical second filter 56 has the first reflected beam 46 incident thereon at an optical-second-filter angle of incidence $\phi$. (The angles $\theta$ and $\phi$ in FIG. 2 are each typically in the range of about 5–15 degrees, but have been exaggerated in FIG. 2 for clarity of illustration.) The optical second filter 56 transmits a second transmitted beam 58 and reflects a second reflected beam 60. The optical second filter 56 transmits a first portion of the frequencies carried by the first reflected beam 46 and reflects a second portion of the frequencies carried by the first reflected beam 46. Preferably, the optical second filter 56 transmits either the first reflected frequency range 50 or the second reflected frequency range 52 (but not both), and reflects the other of the first reflected frequency range 50 and the second reflected frequency range 52.

The optical second filter 56 may be of any operable type that exhibits these transmission and reflection characteristics. The optical second filter 56 may be of the type illustrated in FIG. 3, but more preferably is an edge filter having properties illustrated in FIGS. 4 or 5 in relation to those of the optical bandpass filter 42. Optical edge filters are known in the art for other applications.

Figure 4:
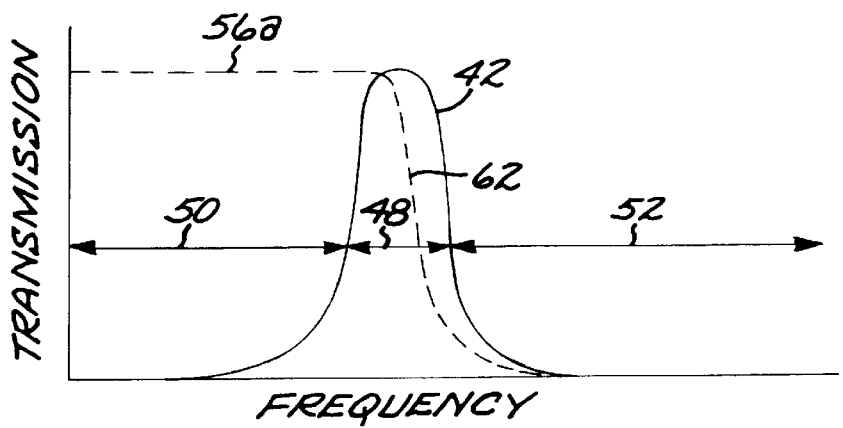
FIG. 4 is an idealized graph of light transmission of the edge filter and the optical bandpass filter, for a low-pass edge filter.

FIG. 4 depicts the edge filter 56 as a low-pass optical filter 56a that transmits light having a frequency less than the frequency of an optical edge 62 and reflects light having a frequency greater than the frequency of the optical edge 62. For this case, the edge filter 56a transmits the light in the first reflected frequency range 50 and reflects the light in the second reflected frequency range 52. (The frequencies within the bandpass-filter frequency range 48 that are less than the frequency of the optical edge 62 have already been extracted by the optical bandpass filter 42, so that the second transmitted beam 58 includes only the first reflected frequency range 50.)

Figure 5:
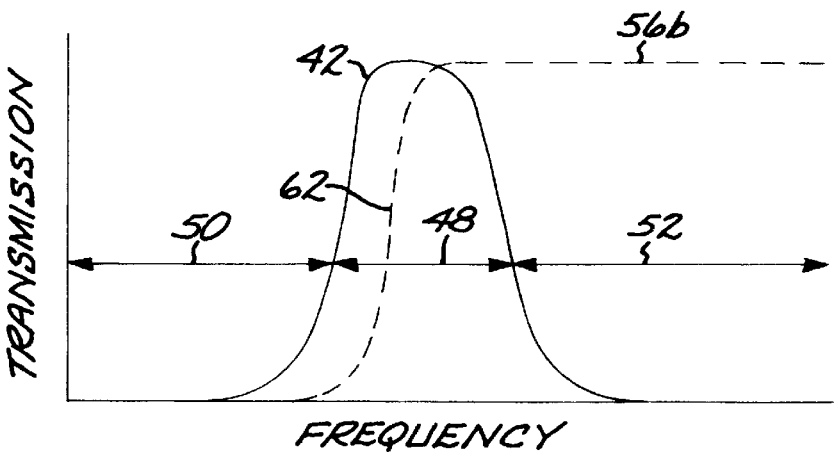
FIG. 5 is an idealized graph of light transmission of the edge filter and the optical bandpass filter, for a high-pass edge filter.

FIG. 5 depicts the edge filter 56 as a high-pass optical filter 56b that transmits light having a frequency greater than the frequency of its optical edge 62 and reflects light having a frequency less than the optical edge 62. For this case, the edge filter 56b transmits the light in the second reflected frequency range 52 and reflects the light in the first reflected frequency range 50. (The frequencies within the bandpass-filter frequency range 48 that are greater than the frequency of the optical edge 62 have already been extracted by the optical bandpass filter 42, so that the second transmitted beam 58 includes only the second reflected frequency range 52.)

In either case of FIGS. 4 and 5, the optical edge 62 is preferably within the bandpass-filter frequency range 48. The optical edge 62 may be anywhere within that range 48.

The second transmitted beam 58 is received by a receiving device. The receiving device may be the second optical device 36, but more typically is a collimator 64 whose output is the second output 30 that is transmitted to the second optical device 36.

The second reflected beam 60 contains that portion of the first reflected beam 46 which is not transmitted through the optical second filter 56 as the second transmitted beam 58. The second reflected beam 60 is received by a receiving device. The receiving device may be the third optical device 38, but more typically is a collimator 66 whose output is the third output 32 that is transmitted to the third optical device 38.

The optical frequency discriminator 26 desirably, but not necessarily, includes an adjustment capability. The adjustment capability increases its useful ranges of operation. It also imparts a flexibility to use filters 42 and 56 that have slight manufacturing variations, thereby increasing manufacturing tolerance and decreasing cost. The adjustment capability includes an optical bandpass filter angular adjustment 68 that alters the bandpass-filter angle of incidence θ of the optical bandpass filter 42 relative to the optical input beam 22, and/or an optical second filter angular adjustment 70 that alters the optical-second-filter angle of incidence φ of the optical second filter 56 relative to the first reflected beam 46. The angular adjustments 68 and 70 include respective pivot axes that are perpendicular to the plane defined by the beams 22, 44, 46, 58, and 60, that is, perpendicular to the plane of the page of the illustration of FIG. 2. The angular adjustments 68 and 70 may be accomplished manually or with an angular adjustment motor such as an angular stepping motor.

The reason for the angular adjustments may be discussed in relation to FIG. 3. The position of the bandpass-filter frequency range 48 along the frequency axis is a function of the physical construction of the optical bandpass filter 42 and the angle of incidence θ of the optical input beam 22. For a fixed physical construction and a first angle of incidence $\theta_1$, the optical bandpass filter 42 has the bandpass properties indicated by the solid line 42. For that same fixed physical construction and a second angle of incidence $\theta_2$, the optical bandpass filter 42 has the bandpass properties indicated by the broken line 42a. The position along the frequency axis of the bandpass-filter frequency range 48 may therefore be adjusted by changing the angle of incidence θ. Similar principles apply to the position of the optical edge 62 for the optical second filter 56 by changing its angle of incidence φ.

The filters 42 and 56 experience some manufacturing variation, so that there is naturally some slight variation in their transmission and reflection properties. When the optical frequency discriminator 26 is assembled, it may be found that the bandpass filter frequency range 48 is displaced from its desired position, or that the edge 62 of the optical second filter 56 does not lie within the bandpass filter frequency range 48, or that there is some other optical problem with the performance of the optical frequency discriminator 26. The adjustments 68 and 70 are used to fine tune the performance of the optical frequency discriminator 26 in this case. The frequency-position of the bandpass-filter frequency range 48 may be adjusted by pivoting the optical bandpass filter 42 using the optical bandpass filter angular adjustment 68 to change the angle of incidence θ. As long as the optical input beam 22 is incident upon the optical bandpass filter 42 at the pivot axis of the optical bandpass filter 42, the first transmitted beam 44 is not deflected or displaced, and the collimator 54 need not be moved as part of the adjustment. An adjustment for the position of the collimator 54 may be provided if desired, however. The angular position of the first reflected beam 46 changes when the angle θ is changed, and it is therefore necessary to move either the collimator 40 or the optical second filter 56/collimator 64 to maintain the alignment of the system.

Similarly, the frequency-position of the optical edge 62 may be adjusted by pivoting the optical second filter 56 using the optical second filter angular adjustment 70 to change the angle of incidence φ. As long as the first reflected beam 46 is incident upon the optical second filter 56 at the pivot axis of the optical second filter 56, the second transmitted beam 58 is not deflected or displaced, and the collimator 64 need not be moved as part of the adjustment. An adjustment for the position of the collimator 64 may be provided if desired, however. Upon changing the value of φ, the angular position of the second reflected beam 60 changes, and it is necessary to provide an adjustment for the collimator 66 to maintain the alignment of the system.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system including an optical frequency discriminator comprising:

a light source of an optical input beam;

an optical bandpass filter having a bandpass filter range and the optical input beam incident thereon at a bandpass-filter angle of incidence, the optical bandpass filter transmitting a first transmitted beam of a bandpass-filter frequency band and reflecting a first reflected beam; and an optical second filter having an optical edge in the bandpass range of the bandpass filter and the first reflected beam incident thereon at a second-filter angle of incidence, the optical second filter transmitting a second transmitted beam and reflecting a second reflected beam.

2. The optical system of claim 1, further including an optical bandpass filter angular adjustment that alters the bandpass-filter angle of incidence of the optical bandpass filter relative to the optical input beam.

3. The optical system of claim 1, further including an optical second filter angular adjustment that alters the second-filter angle of incidence of the second filter relative to the first reflected beam.

4. The optical system of claim 1, wherein the second filter is a low-pass filter that transmits light having a frequency less than the optical edge and reflects light having a frequency greater than the optical edge.

5. The optical system of claim 1, wherein the second filter is a high-pass filter that transmits light having a frequency greater than the optical edge and reflects light having a frequency less than the optical edge.

6. The optical system of claim 1, further including a first optical device that receives the first transmitted beam, a second optical device that receives the second transmitted beam, and a third optical device that receives the second reflected beam.

7. The optical system of claim 6, wherein the first optical device, the second optical device, and the third optical device each comprises an optical demultiplexer.

8. An optical system including an optical frequency discriminator comprising a light source of an optical input beam;

an optical bandpass filter having a bandpass filter range and the optical input beam incident thereon at a bandpass-filter angle of incidence, the optical bandpass filter transmitting a first transmitted beam and reflecting a first reflected beam including a first reflected frequency range less than the bandpass-filter range and a second reflected frequency range greater than the bandpass-filter range; and an optical second filter having the first reflected beam incident thereon at an optical-second-filter angle of incidence, the optical second filter transmitting a second transmitted beam consisting of one of the first reflected frequency range and the second reflected frequency range and reflecting a second reflected beam consisting of the other of the first reflected frequency range and the second reflected frequency range.

9. The optical system of claim 8, further including an optical bandpass filter angular adjustment that alters the bandpass-filter angle of incidence of the optical bandpass filter relative to the optical input beam.

10. The optical system of claim 8, further including an optical second filter angular adjustment that alters the optical-second-filter angle of incidence of the optical second filter relative to the first reflected beam.

11. The optical system of claim 8, wherein the optical second filter is a low-pass filter that transmits light in the first reflected frequency range and reflects light in the second reflected frequency range.

12. The optical system of claim 8, wherein the optical second filter is a high-pass filter that transmits light in the second reflected frequency range and reflects light in the first reflected frequency range.

13. The optical system of claim 8, wherein the optical second filter is an edge filter.

14. The optical system of claim 8, further including a first optical device that receives the first transmitted beam, a second optical device that receives the second transmitted beam, and a third optical device that receives the second reflected beam.

15. The optical system of claim 14, wherein the first optical device, the second optical device, and the third optical device each comprises an optical demultiplexer.

16. An optical system including an optical frequency discriminator comprising a light source of a collimated optical input beam;

an optical bandpass filter having a bandpass filter range and the collimated optical beam incident thereon at a bandpass-filter angle of incidence, the optical bandpass filter transmitting a first transmitted beam of a bandpass-filter frequency band having more than one optical channel of information therein and reflecting a first reflected beam;

an optical bandpass filter angular adjustment that alters the bandpass-filter angle of incidence of the optical bandpass filter relative to the collimated optical input beam;

an optical edge filter having an optical edge in the bandpass range of the bandpass filter and the first reflected beam incident thereon at an edge-filter angle of incidence, the optical edge filter transmitting a second transmitted beam and reflecting a second reflected beam; and an optical edge filter angular adjustment that alters the edge-filter angle of incidence of the edge filter relative to the first reflected beam.

17. The optical system of claim 16, wherein the edge filter is a low-pass filter that transmits light having a frequency less than the optical edge and reflects light having a frequency greater than the optical edge.

18. The optical system of claim 16, wherein the edge filter is a high-pass filter that transmits light having a frequency greater than the optical edge and reflects light having a frequency less than the optical edge.

19. The optical system of claim 16, further including a first optical device that receives the first transmitted beam, a second optical device that receives the second transmitted beam, and a third optical device that receives the second reflected beam.

20. The optical system of claim 19, wherein the first optical device, the second optical device, and the third optical device each comprises an optical demultiplexer.

21. The optical system of claim 1, wherein the optical device further includes a first optical device that receives the first transmitted beam, wherein the first optical device is a demultiplexer.

22. The optical system of claim 1, wherein the second transmitted beam and the second reflected beam each have more than one optical channel of information therein.

23. The optical system of claim 8, wherein the second transmitted beam and the second reflected beam each have more than one optical channel of information therein.

* * * * *